INVENTORS.
HERBERT A. BERNHOLTZ
JOHN P. BADGER

ATTORNEY

United States Patent Office 3,591,422
Patented July 6, 1971

3,591,422
WATER-ACTIVABLE BATTERY UTILIZING ABSORBENT OPEN-CELLED MATERIAL
Herbert A. Bernholtz, Sylvania, and John P. Badger, Genoa, Ohio, assignors to Eltra Corporation, Toledo, Ohio
Filed Apr. 3, 1969, Ser. No. 812,989
The portion of the term of the patent subsequent to Nov. 17, 1987, has been disclaimed
Int. Cl. H01m 45/00
U.S. Cl. 136—162                     14 Claims

ABSTRACT OF THE DISCLOSURE

A storage battery having a plurality of enclosed cells with a separate filler opening positioned over each cell. With each cell, the battery plates are separated from, but in liquid communication with, a body of liquid-absorbent material which is positioned below the filler opening for that cell. The body of absorbent material is of sufficient size and absorbency to retain an amount of concentrated battery acid sufficient to fully activate the cell when water is added through the filler opening to release the concentrated acid from said absorbent body and to fill the battery cell. The absorbent material may be comprised of an open-celled, foamed synthetic material such as a phenolic resin.

---

This invention relates to an improvement in water-activable electric storage batteries of the type commonly used in automobiles—that is, a multi-cell battery in which the positive and negative plates of a plurality of cells are connected in series to common positive and negative terminals and in which each cell is an enclosed space having its own positive and negative plates with no liquid communication between cells.

New or replacement dry-charged batteries which can be quickly and conveniently brought to a fully active condition without the necessity of the installer having to handle a battery electrolyte, such as sulfuric acid, are advantageous for general use and particularly in automotive applications where retail facilities and personnel are not well-equipped or trained to handle battery acid. A number of ways have been proposed to eliminate the direct handling of the battery acid. Some constructions of the prior art include a breakable or dissoluble capsule containing the sulfuric acid which is positioned within the battery cells and which is either broken or dissolved when the battery is ready for activation. Batteries of this type are disclosed in U.S. Pats. 2,773,927, 2,832,814 and 3,-304,202. Such constructions have some disadvantages in that the capsules can be unintentionally broken during shipment; the construction and positioning of the capsules within the battery is often difficult; and a separate tool is required to rupture the capsule.

Other approaches used in the prior art have been to inactivate or immobilize the concentrated sulfuric acid by combining it with a gel-forming or granular-forming agent, such as finely-divided silicon-dioxide, so that, when water is added to the battery at the point of sale, the immobilized acid is released from the gel or granular material to thus activate the battery. In this type of installation, the time required for the battery to become active, after the addition of water, is longer than desirable because the water must diffuse into and the electrolyte must diffuse from the mass of immobilized acid, and also the residual material, such as the silicon-dioxide, can circulate throughout the cells to possibly interfere with the battery action.

It is an object of this invention to provide a water-activable storage battery which eliminates the above-described problems encountered in prior art constructions, which is inexpensive and simple to manufacture, and in which the concentrated sulfuric acid is held within each battery cell but separate from the plates within that cell until the addition of water at the point of sale. This is accomplished by the use of an acid-resistant, liquid-absorbent material which is placed within each cell in liquid communication with, but separate from, the plates of that cell, and which, upon the addition of water at the point of sale, becomes quickly oversaturated to release the acid and water to form an electrolyte of desired strength to fully activate the battery. The liquid-absorbent material is placed within a separate compartment at one end of the plate stack within each cell. The battery construction includes a physical barrier or divider wall to separate the liquid-absorbent material from the plates, but which permits the flow of liquid to the plates after the water has been added.

In general, the present invention consists of the use of a body of liquid-absorbent material, preferably comprising an open-celled, synthetic foam which has a total absorbency so that it is capable of holding, at a level below saturation, an amount of concentrated battery acid such that, when water is added to the cell, the resulting electrolyte has a specific gravity sufficient to fully activate the plates of that cell. The invention described in detail below includes a particular battery construction adapted to facilitate use of such an absorbent material and also concerns the selection of particularly desirable materials for this purpose. Other objects and advantages of the invention will be apparent to those skilled in the art, reference being made to the accompanying drawings in which:

THE ABSORBENT MATERIAL

Figure 1:
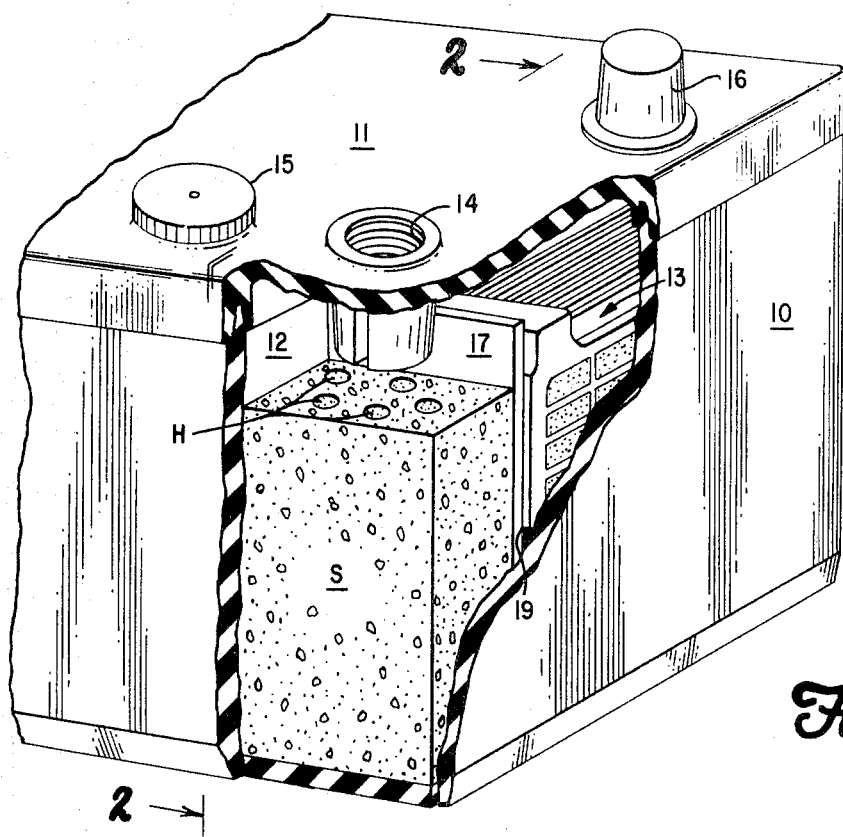
FIG. 1 is a view in perspective of a portion of a multi-cell battery, with the outside case cut away, showing the internal construction of one cell including a separate portion containing a block of liquid-absorbent material.

As previously stated, the selection of the material which comprises the block of absorbent material used in the battery construction shown in FIGS. 1 through 6 is considered to be an important part of this invention. In general, the material should be an open-celled, foamed or granular material whose absorbency is sufficient such that a block thereof positioned within each of the battery cells is capable of holding, at a level below saturation, an amount of concentrated battery acid, such as sulfuric acid, which is capable of fully activating that cell when this acid is released and diluted by the addition of water at the point of sale. In addition, the material should be resistant to the battery acid, or if destroyed by the battery acid, should preferably be of a nature that its residue will not interfere with the subsequent prolonged use of the battery. In the latter case, a material which has a residue which is inert to the action of the battery plates and which will retain itself within the original space as a cohesive mass is desirable. Generally, it has been found that a number of synthetic foam materials of an open-celled nature are preferable. Open-celled, as used herein, means that the material should have communicating voids so that it will function as a sponge to absorb and retain the concentrated acid.

In general, it has been found that open-celled, foamed blocks of phenolic resins, polyvinylchloride, polyethylene, polypropylene, and silicon derivatives [1] may be used for this purpose, while other materials, such as a sponge of ceramic firebrick or activated carbon bound in a matrix of sodium silicate, are satisfactory. Also, a batt comprised of fiberglass or other acid-resistant fibers has been found to be satisfactory. In the following detailed example, an open-celled, synthetic foam was prepared for this purpose, but it is to be understood that certain commercially available foams or other materials can be used.

Example I

Blocks were cut from a body of an open-celled, phenolic foam prepared as described in U.S. Pat. 2,979,469. The weight of such foam was 2.5 lbs. per cubic foot. The foam blocks retained concentrated sulfuric acid to the extent of about 90% of their apparent volume. In order to avoid shake-out of droplets from the foam, it has been found that the limit of saturation of the concentrated sulfuric acid should be about 75% of their volume. It was found that a rectangular block 1.5" x 1.6" x 6.25" is a sufficient size to hold an amount of concentrated sulfuric acid sufficient to fully activate a single cell of a 65-amp-hour, Group 24 battery, as designated by the American Association of Battery Manufacturers. With this type of battery, concentrated sulfuric acid (specific gravity 1.835) was used initially with foam blocks in a battery construction described in detail below. With this size battery, 325 grams of concentrated sulfuric acid per battery cell is necessary for full activation, when diluted. Using a foam block of the size mentioned above, at 75% saturation, the block will hold 184 cubic centimeters, or 338 grams, of acid. Thus, the block is less than 75% saturated.

The weight of the dry foam, as stated above, is about 2½ lbs. per cubic foot. Thus, each block for a single cell (15 cubic inches) weighs only 0.022 lb. In a 12-volt battery, where six such blocks are required, the added weight to the battery, exclusive of the absorbed acid, is only 0.132 lb.

THE BATTERY CONSTRUCTION

Another aspect of the instant invention is the construction of the battery which is adapted to hold the bodies of liquid-absorbent material described above. Referring to the drawings, FIG. 1 shows the internal construction of a single cell of a multiple cell storage battery having an outside case 10 and a cover 11. As previously explained, within the case 10 are lateral cell walls 12 which divide the case into separate, enclosed cells, each having its own stack of interleaved battery plates 13. Positioned in the cover 11 along one edge of the battery are filler openings 14 which are covered by conventional vent caps 15. The positive or negative plates of the stacks 13 in each of the cells are electrically connected in series to a common positive or negative terminal 16, as is the case with conventional multiple cell batteries.

Figure 2:
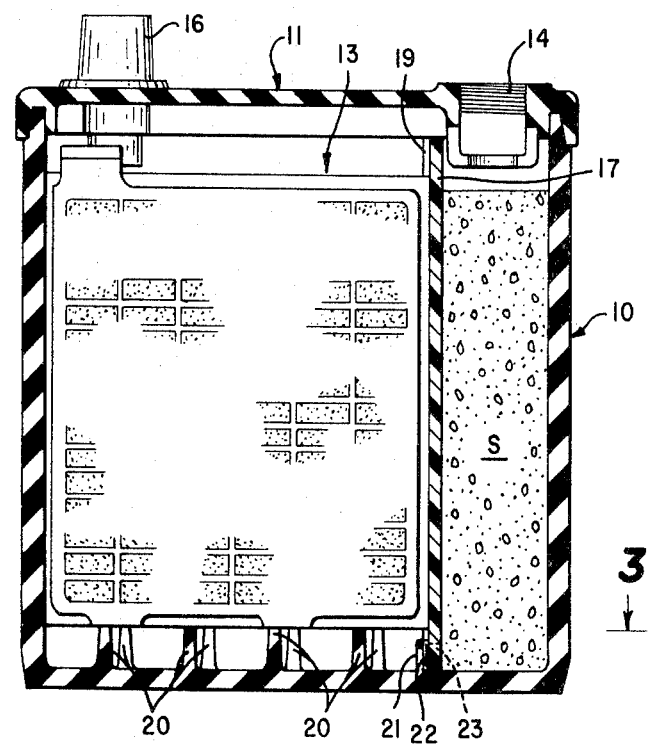
FIG. 2 is a view in elevation, taken along line 2—2 of FIG. 1, and further illustrating the position of a block of absorbent material within a cell relative to the battery plates therein.

As best seen in FIG. 2, at one end of each stack of plates 13 is a divider wall 17 which extends across the interior of the cell, as seen in FIG. 1, and substantially throughout the height of the cell, as seen in FIG. 2. This divider wall 17 separates the major area of the cell containing the plates from a generally rectangular portion lying below the filler opening 14 in each cell in which the body of liquid-absorbent material S is placed.

Figure 3:
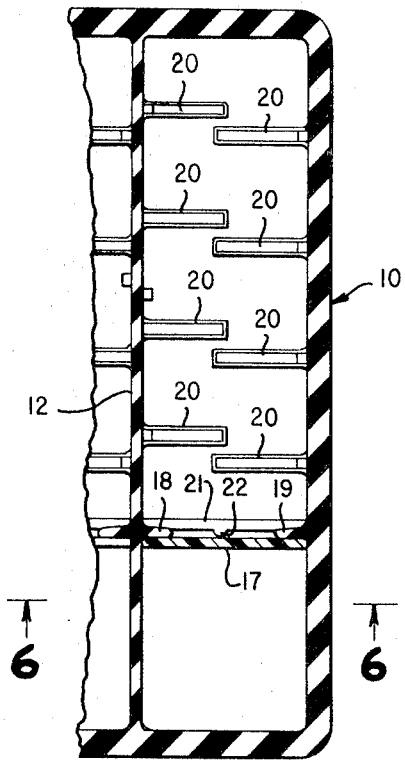
FIG. 3 is a plan view in cross section, taken along line 3—3 of FIG. 2, showing some details of the construction of the battery case designed for this purpose.
Figure 6:
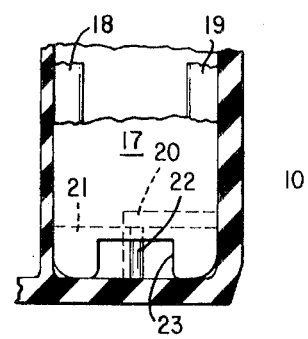
FIG. 6 is a cross-sectional view in elevation taken along line 6—6 of FIG. 3 and shown on an enlarged scale, illustrating the details of the lower portion of the divider wall of FIG. 4.

Referring to FIG. 3, a pair of vertical ribs 18 and 19 are molded opposite one another on each side of the cell walls 12 or interior wall of the case 10 to provide support for the divider wall 17 which is inserted in the battery construction by sliding it into position. On the inner surface of the bottom of the case 10 are a plurality of upwardly-extending, staggered plate bridges or supports 20 which hold the stack of plates 13 above the floor of the case, as best seen in FIG. 2. The plate bridges 20 are staggered and do not extend completely across the cell in order to provide a flow path for liquid entering the plate area of the cell, as will be subsequently described. A lateral barrier 21 extends across the floor of the cell adjacent the vertical ribs 18 and 19, as seen in FIGS. 2, 3 and 6. The height of the barrier 21 is less than that of the plate bridges 20 and its vertical surface adjacent the divider wall 17 includes a spacer bead 22 which, with the ribs 18 and 19, assures separation of the barrier 21 from the lower end of the divider wall 17 when it is in position.

Figure 4:
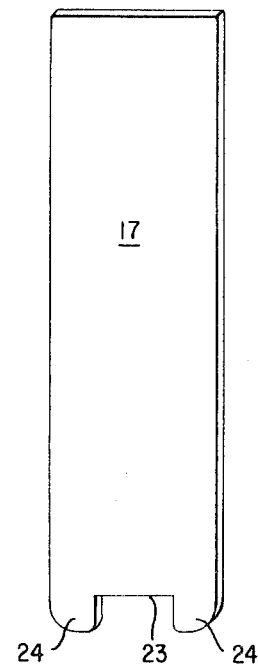
FIG. 4 is a view in perspective of one embodiment of a divider wall used in the construction shown in FIGS. 1 through 3.

Referring to FIG. 4, one embodiment of the divider wall 17 comprises an essentially rectangular sheet of rigid material having a liquid flow passage 23 at its lower end. The lower corners may be rounded or have another suitable configuration to fit the cross section of the lower portion of the cell, as indicated by reference numeral 24. When the divider wall 17 is positioned within the cell adjacent the vertical ribs 18 and 19, its edges substantially conform to the adjacent surfaces of the cell walls 12 and floor of the case 10 so that liquid passing from the portion of the cell containing the absorbent material S must pass through the liquid passage 23 and over the barrier 21 to enter the portion of the cell below the stack of plates 13.

Referring again to FIG. 1, with the battery construction thus described, and with a block of liquid-absorbent material S positioned within each of the cells and partially saturated with concentrated battery acid, as previously described, the acid is effectively separated from the stack of plates 13 within each cell by the divider walls 17. Although it has been found that saturation at a level of 75% or less will effectively prevent shake-out of the acid during transportation of the battery, in the event some acid does concentrate at the bottom of the block of absorbent material S, it will be prevented from entering the plate area of the cell by the barrier 21.

When the battery is ready for activating, as at the point of sale, water poured through the filler opening 14 will directly contact the absorbent material S and, as it passes downwardly through the absorbent material S, will release the concentrated acid so that the acid and water will flow over the barrier 21 and into the area below the plates. As the flow continues, the acid will pass between the staggered plate bridges 20 and, as additional liquid is added, the level will rise to the proper electrolyte level within that cell. As previously pointed out, be- ---
[1] Such foams and their preparation are described in Modern Plastics Encyclopedia, October 1968, vol. 45, No. 14A (McGraw-Hill).

cause the concentrated battery acid is absorbed within the block of material S, its subsequent release by the addition of water is rapid, and does not require any chemical liberation and the resultant undesirable time delay. To further increase the rate at which water can be added, a number of longitudinal holes H, as indicated in FIG. 1, may be provided in the absorbent material S.

The absorbent block of material S will retain a substantial amount of the heat generated when the concentrated acid is diluted by the entering water so that this heat will not be transmitted to other parts of the battery, such as the plates, which are subject to damage from excess heat. Finally, should surface fragments from the block of material S become separated, they cannot enter the plate portion of the cell, due to the divider wall 17 and barrier 21.

Figure 5:
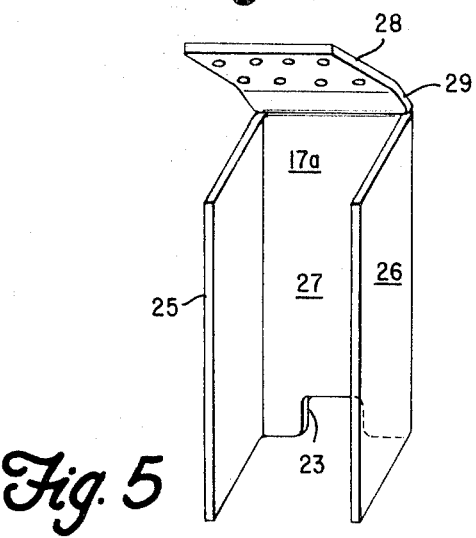
FIG. 5 is a view in perspective of another embodiment of a divider wall which can be used in the battery construction of this invention.

Referring to FIG. 5, an alternate embodiment 17a of the divider wall 17 is shown. In this embodiment, the wall includes a pair of side flanges 25 and 26 which, with the connecting web 27, forms a three-sided closure for the block of absorbent material S placed therein. At the top of the web 27 is a perforate cover 28 connected by a fold strip 29. Using the embodiment shown in FIG. 5, the block of material S is placed within the battery by fist inserting it between the side flanges 25 and 26, folding the perforate cover 28 down to a horizontal position, and then sliding the entire assembly into the battery between the cell walls 12 and vertical ribs 18 and 19. Use of this embodiment facilitates the handling of the absorbent material, particularly if it has been previously loaded with the concentrated acid.

A number of methods may be used to load the blocks of absorbent material S with the concentrated acid. One method is to first insert the dry blocks within the battery, and then pour a predetermined, measured amount of concentrated acid into the blocks, either before the battery is fully constructed or through the filler opening 14 on the cover after the battery has been constructed. Another method is to immerse each of the blocks in concentrated acid for a time sufficient to absorb only the desired amount (75% of saturation, for example) of acid. Various other methods of conveniently handling the acid will be apparent to those skilled in the art.

The above-described battery construction and materials for fabrication of the liquid-absorbent blocks effectively provide a water-activable battery free of the difficulties encountered with certain other batteries of the prior art. It will be apparent that certain modifications in the construction may be made to effect the same mode of operation, as long as the absorbent material is physically separated from, but in liquid communication with, the plates within each cell. For example, the positioning of the block of material S, rather than at the end of the stack of plates 13, can be changed and the geometrical configuration of the block is not considered to be an important part of the invention. Likewise, certain other liquid-absorbent materials in addition to those previously enumerated may be effectively used for this purpose.

We claim:

1. In a battery having at least one cell including a plurality of battery plates enclosed within said cell, the improvement comprising a liquid-absorbent body of open-celled material retaining a concentrated acid placed within said cell spaced from but in liquid communication with said plates, said absorbent material having an absorbent capacity sufficient to retain an amount of said concentrated acid sufficient to fully activate said cell when said cell is filled with water to release said concentrated acid from said absorbent material.

2. A battery construction comprising at least one enclosed cell having positive and negative plates and a volume of liquid-absorbent open-celled material retaining a concentrated acid placed within said cell out of contact with said plates but in liquid communication therewith, said liquid-absorbent material having a total absorbent capacity sufficient to retain an amount of said concentrated battery acid sufficient to activate said cell when said concentrated acid is released by adding additional liquid to said cell.

3. In a multiple cell storage battery having a plurality of separate cells each having a plurality of interleaved positive and negative battery plates with the plates of the cells electrically connected in series to a common positive and a common negative terminal, the improvement comprising a body of liquid-absorbent open-celled material retaining a concentrated acid placed within each cell out of contact with but in liquid communication with the plates of that cell, said body of absorbent material having an absorbent capacity sufficient to retain, at a level below saturation, an amount of said concentrated battery acid sufficient to fully activate said cell when said concentrated acid is released by the addition of water to that cell.

4. A battery construction comprising at least one enclosed cell having positive and negative plates and a body of a liquid-absorbent material which is an open-celled, phenolic, polyvinylchloride, polyethylene, polypropylene, or silicone foam, said body of absorbent material retaining a concentrated acid positioned within said cell separated from but in liquid communication with said plates and having a liquid-absorbent capacity sufficient to retain an amount of said battery acid sufficient to fully activate said cell when said concentrated acid is released by the addition of additional liquid to said cell.

5. An electric storage battery having a plurality of separate, enclosed cells, each cell including a plurality of battery plates enclosed within said cell, a divider wall extending vertically through said cell adjacent the ends of said plates with a liquid passage therethrough, a body of absorbent open-celled material retaining a concentrated acid positioned within said cell on the opposite side of said divider wall, said body of absorbent material having a total absorbent capacity sufficient to retain an amount of said concentrated battery acid sufficient to fully activate said cell, and a filler opening positioned above said absorbent body in each cell whereby additional liquid entering said cell through said filler opening will release said concentrated acid to activate said cell.

6. The battery of claim 5 wherein said liquid passage is in the lower portion of said divider wall.

7. The battery of claim 5 which further includes a horizontal, perforate cover extending from said divider wall over said body of absorbent material and under said filler opening.

8. A storage battery having an external case, a cover, a plurality of laterally-extending cell walls dividing the interior of said case into separate cells, and a stack of interleaved battery plates positioned within each of said separate cells, the improvement comprising a separator wall in each cell extending adjacent the ends of the battery plates in said stack, said separator wall extending generally at right angles to said cell walls to separate a portion of said cell from said plates, a body of absorbent open-celled material retaining a concentrated acid positioned within said separate portion of said cell, said body having an absorbent capacity sufficient to retain an amount of said concentrated battery acid sufficient to fully activate said cell when said concentrated acid is released from said body by the addition of additional liquid thereto, and a liquid passage extending through said separator wall at the lower portion thereof such that liquid added to said cell in said separate portion thereof will release said concentrated acid from said absorbent body and pass as diluted acid through said liquid passage to said plate stack.

9. The storage battery of claim 8 which further includes a filler opening in said cover positioned over said absorbent body in each of said cells whereby liquid entering said filler opening will pass downwardly through said absorbent body to release said concentrated acid and thence will pass as diluted acid through said liquid passage to said plate stack.

10. The storage battery of claim 8 wherein said body of absorbent material is of a size and shape to substantially fill said separate portion in each of said cells.

11. The storage battery of claim 8 wherein said bodies of absorbent material are comprised of an open-celled, phenolic, polyvinylchloride, polyethylene, polypropylene, or silicone foam.

12. The storage battery of claim 8 wherein said bodies of absorbent material are comprised of a porous ceramic firebrick.

13. The storage battery of claim 8 wherein said bodies of absorbent material are comprised of activated carbon bound in a matrix of sodium silicate.

14. The storage battery of claim 8 wherein said bodies of absorbent material are comprised of a batt of acid-resistant fibers.

References Cited

UNITED STATES PATENTS

| | | | |
|---|---|---|---|
| 1,503,993 | 8/1924 | Mummery | 136—114 |
| 1,583,445 | 5/1926 | Collins | 136—157 |
| 1,784,592 | 12/1930 | Heise et al. | 136—116 |
| 3,067,275 | 12/1962 | Solomon | 136—153 |
| 3,304,202 | 2/1967 | Sam | 136—6 |
| 3,328,208 | 6/1967 | Ryhiner | 136—157 |

ALLEN B. CURTIS, Primary Examiner

A. SKAPARS, Assistant Examiner

U.S. Cl. X.R.

136—181